(12) United States Patent
Saiki et al.

(10) Patent No.: US 12,109,873 B2
(45) Date of Patent: Oct. 8, 2024

(54) SLIDING DOOR STRUCTURE

(71) Applicant: HONDA MOTOR CO., LTD., Tokyo (JP)

(72) Inventors: Yuichiro Saiki, Tokyo (JP); Takashi Fukahori, Tokyo (JP); Joji Goto, Tokyo (JP); Tomoaki Ando, Tokyo (JP); Katsuhiro Yoshiyama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 355 days.

(21) Appl. No.: 17/678,141

(22) Filed: Feb. 23, 2022

(65) Prior Publication Data

US 2022/0289005 A1 Sep. 15, 2022

(30) Foreign Application Priority Data

Mar. 12, 2021 (JP) .................. 2021-040193

(51) Int. Cl.
*B60J 5/06* (2006.01)
*B60J 5/04* (2006.01)
*E05D 15/10* (2006.01)

(52) U.S. Cl.
CPC .............. *B60J 5/06* (2013.01); *B60J 5/0477* (2013.01); *E05D 15/101* (2013.01); *E05Y 2900/531* (2013.01)

(58) Field of Classification Search
CPC .......... B60J 5/06; B60J 5/0477; B60J 5/0479; E05D 15/101; E05D 15/1047; E05D 15/066; E05D 15/0686; E05D 2015/1055; E05Y 2201/22; E05Y 2201/684; E05Y 2600/686; E05Y 2800/682

USPC ............................................ 296/155; 49/449
See application file for complete search history.

(56) References Cited

U.S. PATENT DOCUMENTS

| | | |
|---|---|---|
| 2006/0049667 A1 | 3/2006 | Suzuki |
| 2016/0356069 A1 | 12/2016 | Choi et al. |
| 2019/0135349 A1 | 5/2019 | Nusier et al. |
| 2019/0225276 A1 | 7/2019 | Nakashima et al. |
| 2020/0190880 A1 | 6/2020 | Yun |
| 2020/0223490 A1 | 7/2020 | Min et al. |
| 2020/0398650 A1 | 12/2020 | Yun |

FOREIGN PATENT DOCUMENTS

| | | |
|---|---|---|
| CN | 101445033 A | 6/2009 |
| CN | 106218369 A | 12/2016 |
| CN | 110065534 A | 7/2019 |
| CN | 110126599 A | 8/2019 |
| CN | 111301124 A | 6/2020 |

(Continued)

OTHER PUBLICATIONS

Japanese Office Action dated Dec. 6, 2022 issued in corresponding Japanese application No. 2021-040193; English machine translation included (10 pages).

(Continued)

*Primary Examiner* — Dennis H Pedder
(74) *Attorney, Agent, or Firm* — Rankin, Hill & Clark LLP

(57) ABSTRACT

A wall surface of a reinforcing bracket is provided with engagement holes (engaged portions) on a front side and a rear side, respectively. A lower arm of a front door and a lower arm of a rear door are each provided with an engagement projection (engaging portion) that engages with an engagement hole when the front door and the rear door fully close.

8 Claims, 8 Drawing Sheets

(56) References Cited

FOREIGN PATENT DOCUMENTS

| | | |
|---|---|---|
| CN | 112092589 A | 12/2020 |
| JP | 2006-69430 A | 3/2006 |
| JP | 2007-138666 | 6/2007 |
| JP | 2007-145092 A | 6/2007 |
| JP | 2020-111311 A | 7/2020 |
| JP | 2021-30915 A | 3/2021 |

OTHER PUBLICATIONS

Chinese Office Action Corresponding to Chinese Application No. 202210106030.5 dated Jul. 9, 2023, 9 pages.

SLIDING DOOR STRUCTURE

INCORPORATION BY REFERENCE

The present application claims priority under 35 U.S.C. § 119 to Japanese Patent Application No. 2021-040193 filed on Mar. 12, 2021. The content of the application is incorporated herein by reference in its entirety.

BACKGROUND OF THE INVENTION

Field of the Invention

The present invention relates to a sliding door structure.

Description of the Related Art

Some vehicles use sliding doors that open and close by sliding.

For such a sliding door structure, there is conventionally disclosed a technique such that: when the sliding door is at the fully closed position, a hook, which is formed at the end of a lower arm in the vehicle body front direction, engages with a catcher pin erected on the bottom surface of a sill bracket; and there is provided a projecting portion, which is provided on a side sill between a guide roller and an arm insertion opening, on the upper side of the lower arm when the sliding door is at the fully closed position, and which projects toward the lower arm (see, for example, Japanese Patent Laid-Open No. 2007-138666).

In the conventional technique, if the sliding door is deformed due to a side collision and the lower arm is lifted from the base portion side, excessive force is not applied to the arm insertion opening opened in the side sill, which can effectively prevent breakage. Furthermore, the sliding door can be deformed in a stable deformation mode, so that the impact load can be efficiently absorbed.

However, when the conventional technique is applied to a vehicle with a door structure in which both the front door and the rear door open and close by sliding and without a center pillar, an impact applied at the time of a side collision or the like may move the front door and the rear door differently. This may apply excessive force on the front door and rear door or the vehicle body side to open the front door and rear door.

The present invention has been made in view of the above points, and it is an object of the present invention to provide a sliding door structure capable of preventing a front door and a rear door from opening due to an impact if the front door and the rear door are subjected to the impact.

SUMMARY OF THE INVENTION

To achieve the above object, an aspect of the present invention is a sliding door structure of a vehicle in which a front door and a rear door both are sliding doors, the sliding door structure including: a front door and a rear door; lower arms respectively extending from lower parts of the front door and the rear door toward the vehicle body; and lower rails, attached on an upper part of a side sill of the vehicle body, for guiding lower rollers attached on ends of the lower arms, wherein: on the side sill, there is attached a reinforcing bracket having a wall surface facing the outside of the vehicle body; the wall surface of the reinforcing bracket is provided with engaged portions on a front side and a rear side, respectively; and the lower arm of the front door and the lower arm of the rear door are each provided with an engaging portion that engages with each of the engaged portions when the front door and the rear door are fully closed.

In the above configuration, the engaged portions and the engaging portions are provided so that engagement directions of the front side and the rear side intersect each other.

In the above configuration, there is provided a striker that fits a latch mechanism when the front door fully closes, in a vicinity of a substantially central portion in a front-rear direction of the reinforcing bracket, the latch mechanism being provided on the front door; and the reinforcing bracket and the striker are jointly fastened and fixed to the side sill.

In the above configuration, there is provided a striker that fits a latch mechanism when the front door fully closes, in a vicinity of a substantially central portion in a front-rear direction of the reinforcing bracket, the latch mechanism being provided on the front door; and a vertical wall portion of the reinforcing bracket is placed on the vehicle inner side of the striker.

In the above configuration, the lower rails each have a lower rail bracket extending toward the reinforcing bracket; and the lower rail bracket is formed with a hole portion corresponding to the engaged portion, a periphery of the hole portion is provided with a cushioning member, and the cushioning member comes into contact with a base portion of each engaging portion when the front door and the rear door fully close.

In the above configuration, the lower rail bracket is fixed to the reinforcing bracket.

In the above configuration, base end parts of the lower arms of the front door and the rear door are each provided with a sliding door bracket and a female member connecting the sliding door bracket and the lower arm; and a reinforcing member is attached on an upper surface of the reinforcing bracket, the reinforcing member including a stepped portion into which a support portion of the female member is inserted.

According to an aspect of the present invention, when the front door and the rear door are fully closed, the engagement holes of the reinforcing bracket are engaged with the engagement projections provided on the lower arm of the front door and the lower arm of the rear door. This configuration can almost integrally hold the front door and the rear door via the reinforcing bracket. Therefore, when an impact is applied to the front door and the rear door at the time of a side collision, it is possible to prevent the front door and the rear door from moving differently, and it is possible to prevent the front door and the rear door from opening due to the impact.

DETAILED DESCRIPTION OF THE PREFERRED EMBODIMENTS

Embodiments

The following describes embodiments of the present invention with reference to the drawings. In the description, left and right refer to left and right based on the occupant of a vehicle, and front and rear refer to front and rear based on the traveling direction of the vehicle.

Figure 1:
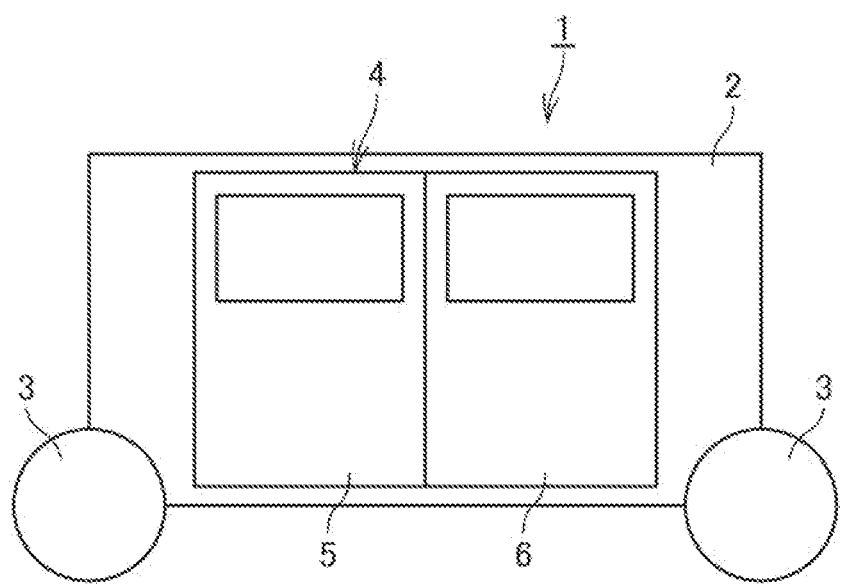
FIG. 1 is a front view of a vehicle to which a sliding door structure of the present invention is applied.

FIG. 1 is a schematic side view showing an embodiment of a vehicle to which a sliding door structure of the present invention is applied.

As shown in FIG. 1, a vehicle 1 includes tires 3 in front and rear of a vehicle body 2. Both sides of the vehicle body 2 are provided with sliding doors 4.

The sliding doors 4 include a front door 5 and a rear door 6. The front door 5 slides to open toward the front of the vehicle body 2 from the fully closed state. The rear door 6 slides to open toward the rear of the vehicle body 2 from the fully closed state.

In addition, the vehicle body 2 has a what is called pillarless structure having no center pillar. When the front door 5 and the rear door 6 are closed, the front door 5 is fixed to the lower part of the vehicle body 2 via a latch mechanism, and the rear door 6 is locked to the front door 5 to be fixed.

The following describes the sliding door structure in this embodiment.

Figure 2:
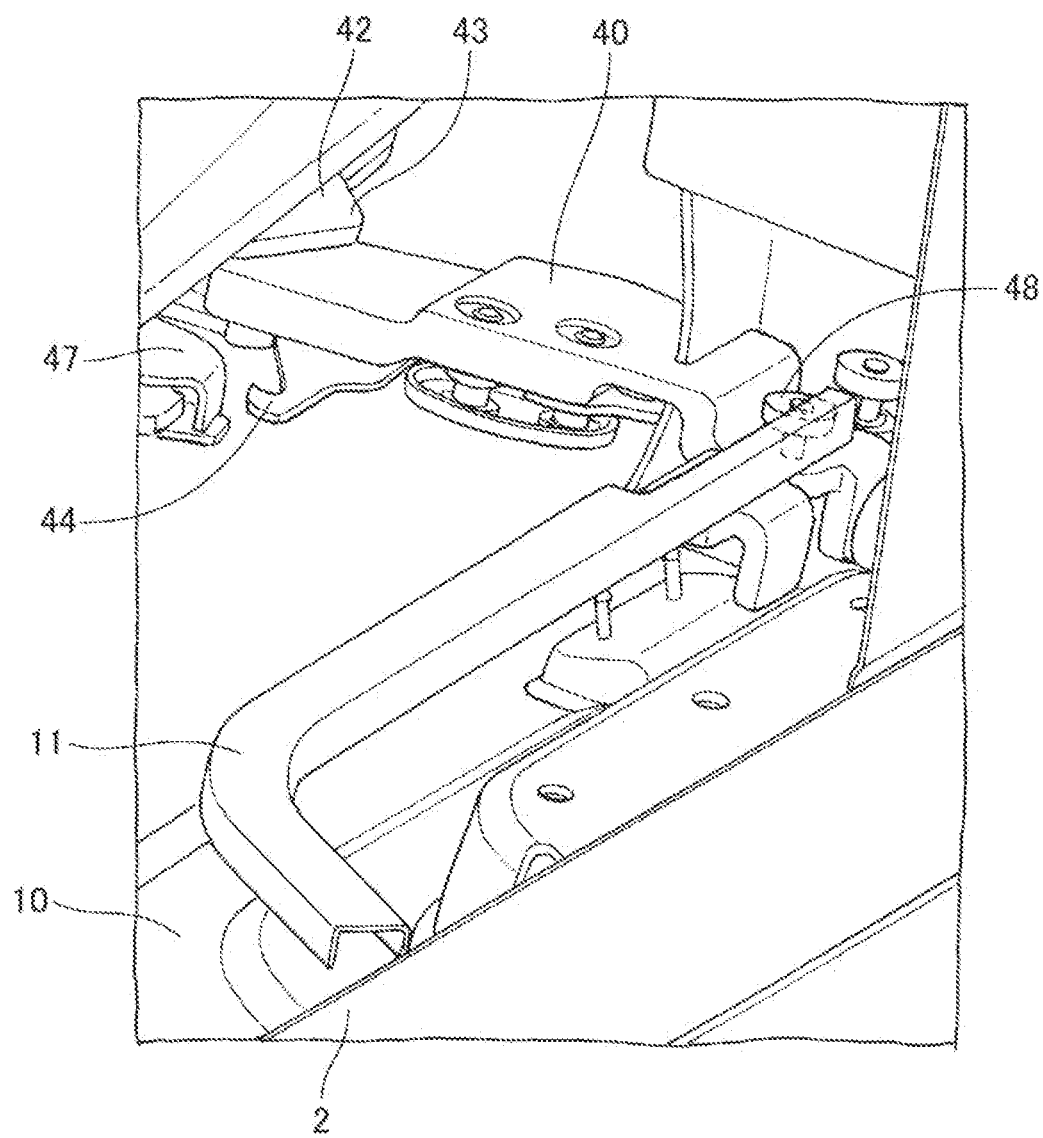
FIG. 2 is a perspective view of a lower arm portion in this embodiment.
Figure 3:
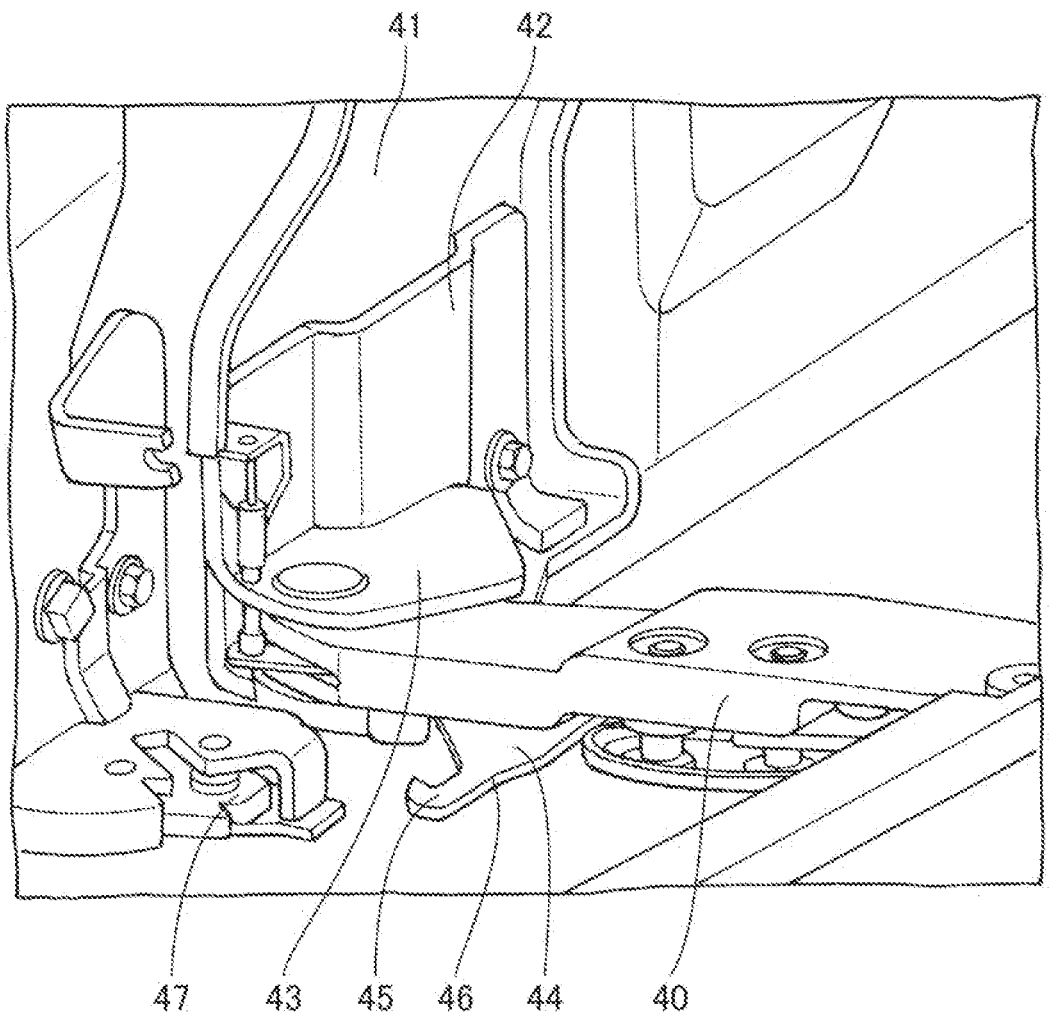
FIG. 3 is a perspective view of a lower arm portion in this embodiment.
Figure 4:
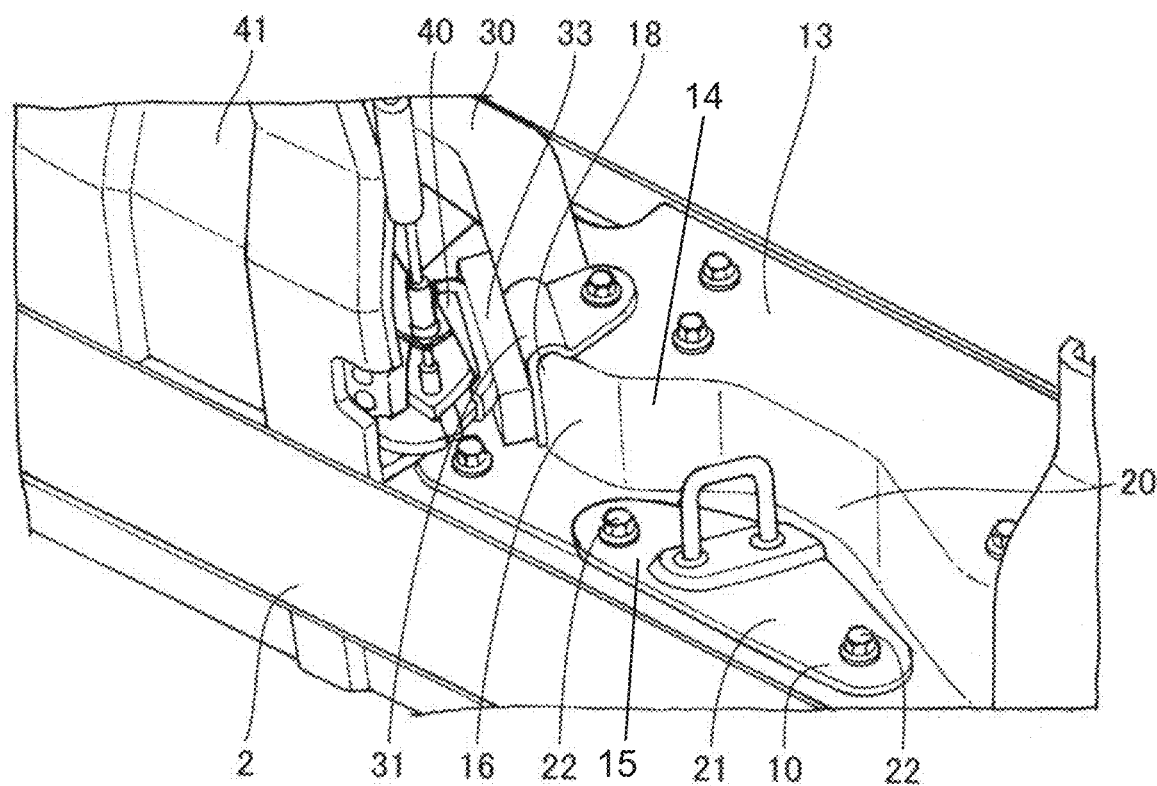
FIG. 4 is a perspective view of a reinforcing bracket portion in this embodiment.
Figure 5:
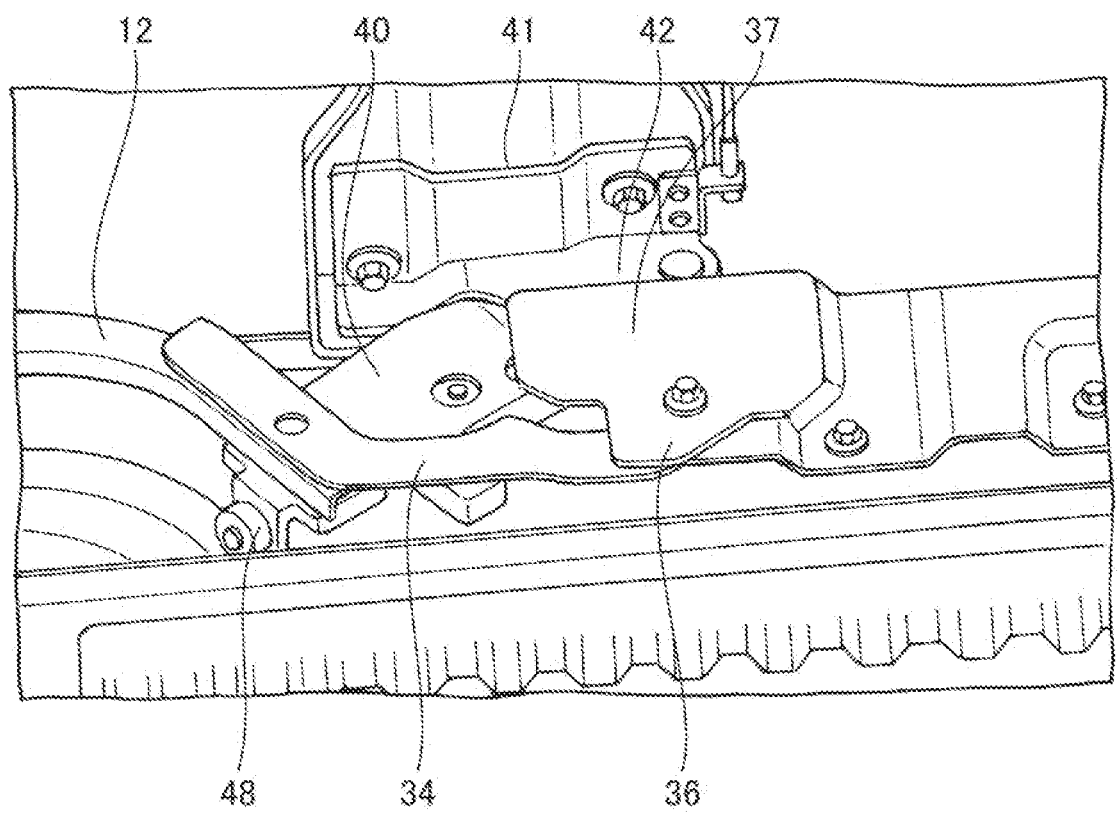
FIG. 5 is a perspective view of the reinforcing bracket portion in this embodiment as viewed from the inside of a vehicle.
Figure 6:
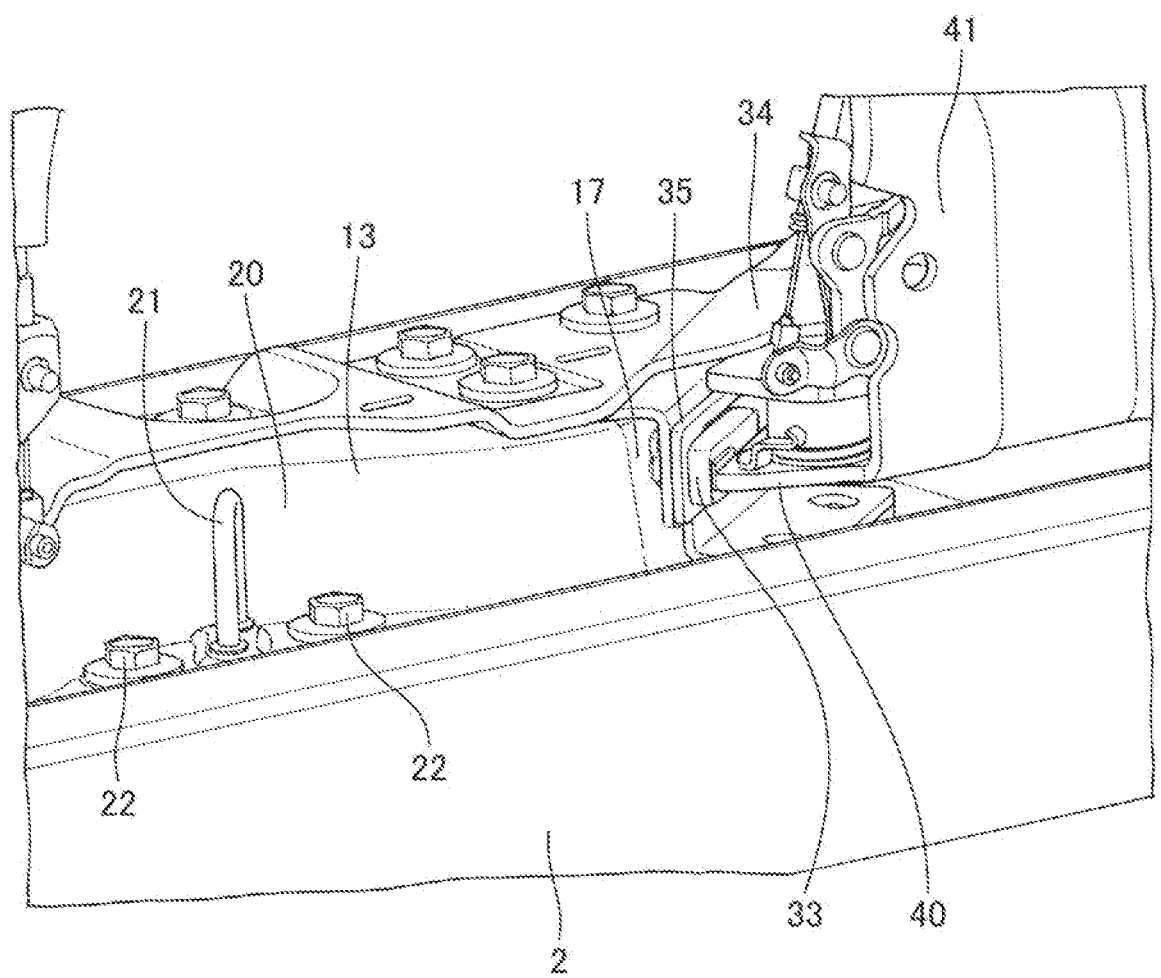
FIG. 6 is a perspective view of the reinforcing bracket portion in this embodiment.
Figure 7:
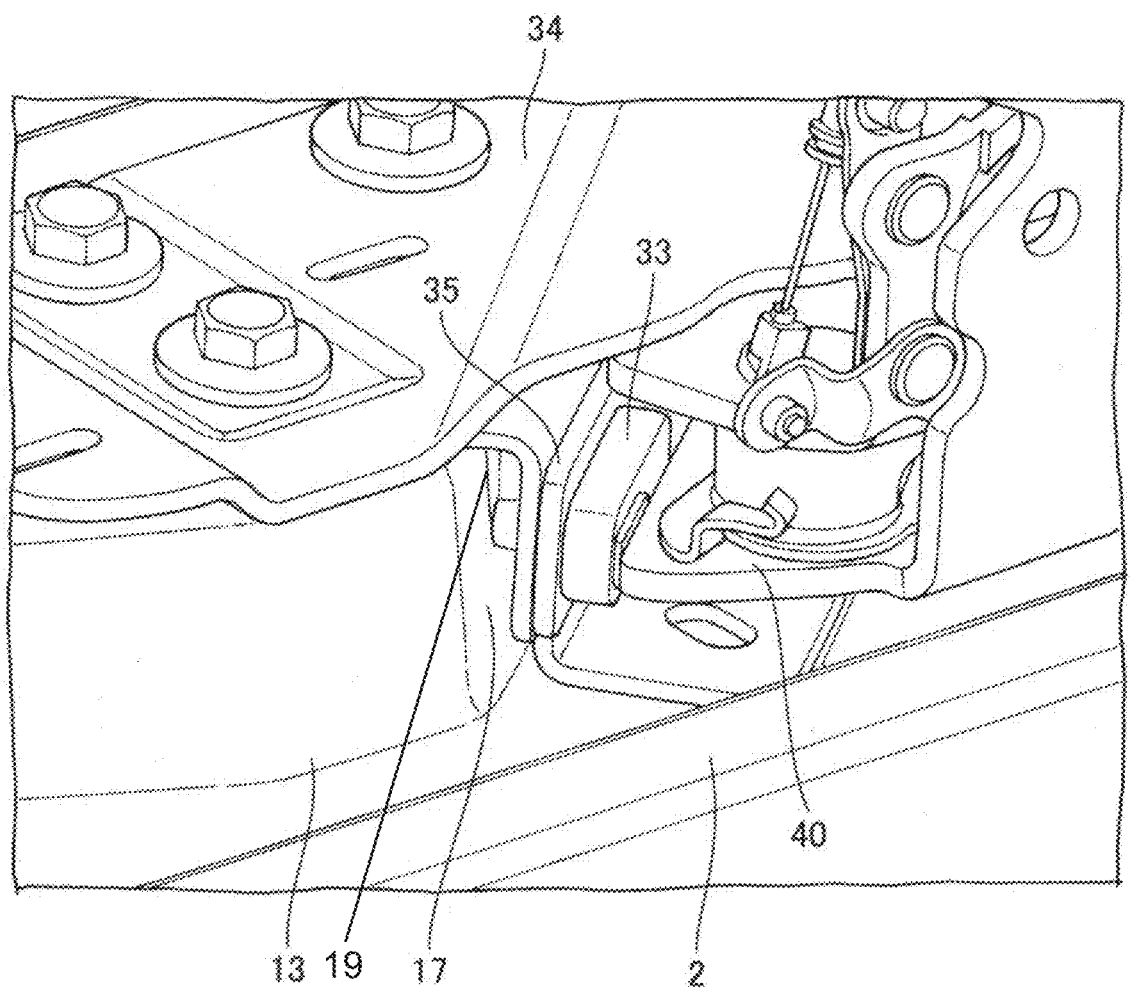
FIG. 7 is a perspective view showing a state in which an engagement projection engages with a rear engagement hole of the reinforcing bracket in this embodiment.
Figure 8:
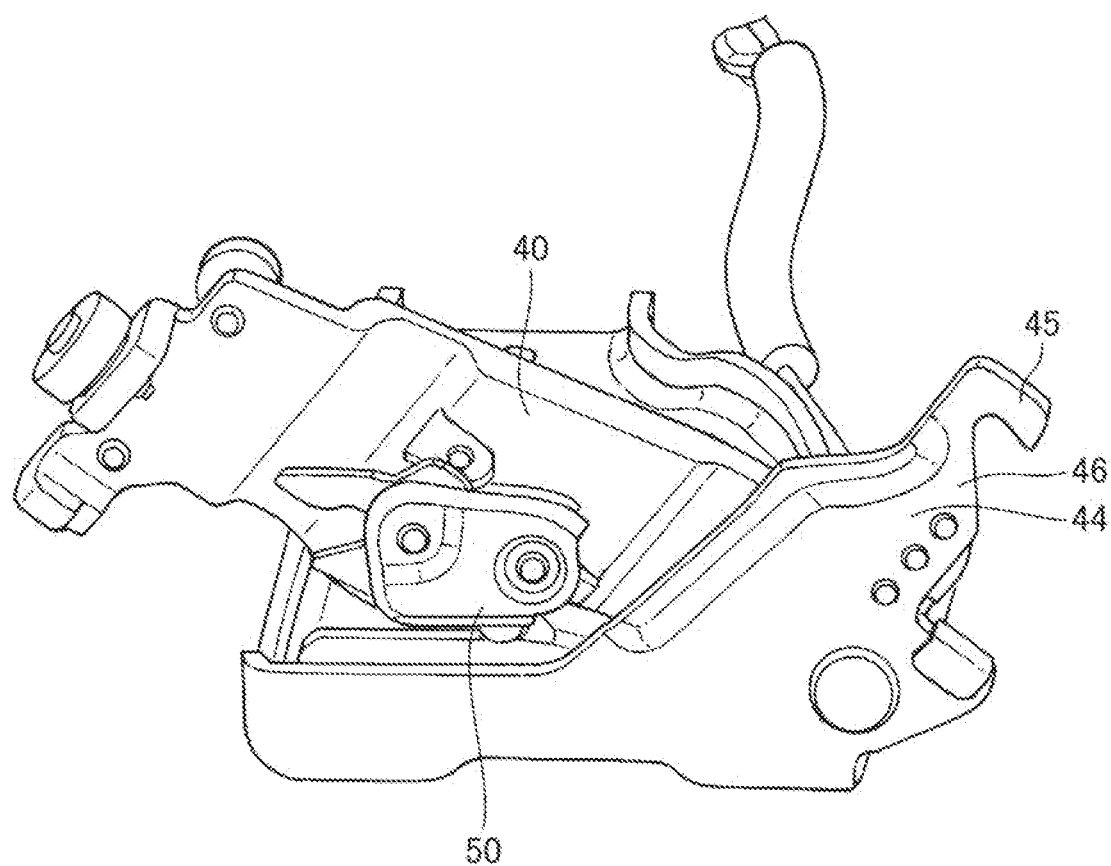
FIG. 8 is a perspective view of the lower arm in this embodiment as viewed from below.

FIG. 2 is a perspective view of a lower arm portion of the sliding door structure in this embodiment. FIG. 3 is a perspective view of the lower arm portion of the sliding door structure according to this embodiment. FIG. 4 is a perspective view of a reinforcing bracket portion of the sliding door structure according to this embodiment. FIG. 5 is a perspective view of the reinforcing bracket portion of the sliding door structure in this embodiment as viewed from the inside of the vehicle. FIG. 6 is a perspective view of the reinforcing bracket portion of the sliding door structure according to this embodiment. FIG. 7 is a perspective view showing a state in which an engagement projection engages with a rear engagement hole of the reinforcing bracket of the sliding door structure according to this embodiment. FIG. 8 is a perspective view of the lower arm in this embodiment as viewed from below.

As shown in FIGS. 2 to 8, the lower end of the opening of the vehicle body 2 is provided with a side sill 10 extending in the front-rear direction of the vehicle body 2. The upper surface side of the side sill 10 is provided with a front lower rail 11 and a rear lower rail 12 so as to be along the side sill 10.

A part between the rear end part of the front lower rail 11 and the front end part of the rear lower rail 12 is provided with a reinforcing bracket 13.

The reinforcing bracket 13 is formed in a box shape with a hollow inside, and the reinforcing bracket 13 includes a vertical wall portion 14 erected in the up-down direction around the reinforcing bracket 13. The lower end edge of the reinforcing bracket 13 is integrally formed with a flange portion 15 extending to the outside of the vehicle body 2.

Furthermore, the reinforcing bracket 13 includes a front support surface 16 and a rear support surface 17, which are inclined with respect to the front-rear direction of the vehicle body 2, at both ends in the front-rear direction. The front support surface 16 and the rear support surface 17 are formed so that the direction orthogonal to the front support surface 16 and the direction orthogonal to the rear support surface 17 intersect each other inside the vehicle body 2.

The front support surface 16 and the rear support surface 17 are formed with a front engagement hole 18 and a rear engagement hole 19, each of which is a substantially square engaged portion.

The reinforcing bracket 13 includes a recess portion 20 formed so that the vertical wall portion 14 on the outside of the vehicle body 2 in the substantially the central part in the front-rear direction is dented toward the inside of the vehicle.

At a position corresponding to the recess portion 20 of the reinforcing bracket 13, the side sill 10 is provided with a striker 21 for locking the latch mechanism of the front door 5, which is to be described below. The flange portion 15 of the reinforcing bracket 13 and the striker 21 are jointly fastened and fixed to the side sill 10 via bolts 22.

As shown in FIG. 4, the front lower rail 11 and the upper surface of the reinforcing bracket 13 are connected via a front lower rail bracket 30.

The front lower rail bracket 30 is integrally formed with a support plate 31 that is bent downward along the front support surface 16. At a position corresponding to the front engagement hole 18 of the reinforcing bracket 13, the support plate 31 is formed with a front hole portion (not shown) having substantially the same shape as the front engagement hole 18.

The periphery of the front hole portion is provided with a cushioning member 33 made of, for example, a resin material.

Similarly, as shown in FIG. 5, the rear lower rail 12 and the upper surface of the reinforcing bracket 13 are connected via a rear lower rail bracket 34. As shown in FIG. 5, the rear lower rail bracket 34 is integrally formed with a support plate 35 that is bent downward along the rear support surface 17. At a position corresponding to the rear engagement hole 19 of the reinforcing bracket 13, the support plate 35 is formed with a rear hole portion (not shown) having substantially the same shape as the rear engagement hole 19.

The periphery of the rear hole portion is provided with a cushioning member 33 made of, for example, a resin material.

As shown in FIG. 5, the upper surface of the reinforcing bracket 13 has a reinforcing member 36 attached thereon. On the indoor side of the vehicle body 2, the reinforcing member 36 is formed with a stepped portion 37 projecting upward.

A space is formed between the lower surface side of the stepped portion 37 and the upper surface of the reinforcing bracket 13. This space is a support space into which the support piece 43 of the female member 42, which is to be described below, is inserted.

The following describes the configuration of the sliding door.

As shown in FIGS. 2 and 3, at the lower part of the front door 5, there is attached a lower arm 40 protruding to the indoor side of the vehicle body 2.

The lower part of the front door 5 has a sliding door bracket 41 attached thereon, and the sliding door bracket 41 has a female member 42 attached thereon. The female member 42 is formed in a substantially L shape so that its lower end part extends to inside of the vehicle. The extending part of the female member 42 is a support piece 43, which is a support portion to be inserted into the space formed in the stepped portion 37 of the reinforcing member 36.

The lower arm 40 is turnably attached to the lower end part of the female member 42.

At the end part of the lower arm 40, there is rotatably attached a lower roller 48 that engages with the front lower rail 11 and is guided along the front lower rail 11.

The middle of the lower arm 40 is provided with an engagement projection 44 as an engaging portion that protrudes diagonally from one side and engages with the front engagement hole 18.

The engagement projection 44 includes a projection portion 45 that is inserted into and engages with the front engagement hole 18, and a base portion 46 that extends to both sides in the base end part of the projection portion 45.

In the vicinity of the base end part of the lower arm 40, there is attached a latch member for full closing 47 that engages with the striker 21 and holds the front door 5 in the closed state when the front door 5 fully closes.

On the lower surface of the front lower rail 11, there is attached a latch member for full opening 50 that holds the front door 5 in the open state when the front door 5 fully opens.

Furthermore, as shown in FIG. 7, the rear door 6 also has a lower arm 40 attached thereto, and the lower arm 40 is provided with an engagement projection 44, which is an engaging portion that engages with the rear engagement hole 19 of the reinforcing bracket 13.

The following describes the operation of this embodiment with the above configuration.

In this embodiment, when the front door 5 closes, the front door 5 moves in the closing direction while the lower roller 48 of the front door 5 is guided by the front lower rail 11.

Then, while the front door 5 is guided by the front lower rail 11, the rear end part of the front door 5 moves to the vehicle body 2 side, and the front door 5 closes.

With the front door 5 completely closed, the engagement projection 44 provided on the lower arm 40 is inserted into the front engagement hole 18 of the reinforcing bracket 13.

In this state, the support piece 43 of the female member 42 is inserted into the stepped portion 37 of the reinforcing member 36. This can prevent the front door 5 and the rear door 6 from falling to the outside of the vehicle body 2. Furthermore, the reinforcing member 36, which has a plate shape, can reduce the height from the side sill 10 to the reinforcing member 36, and can make the door opening larger. In addition, the reinforcing member 36 has a plate shape extending in the extending direction of the side sill 10, so that the support piece 43 of the female member 42 gradually slips in while the front door 5 slides. This can prevent the door from falling to the outside of the vehicle body 2 during the opening-closing operation of the front door 5 as well.

Similarly, the rear door 6 also moves while the lower roller 48 of the lower arm 40 is guided by the rear lower rail 12. With the rear door 6 completely closed, the engagement projection 44 provided on the lower arm 40 is inserted into the rear engagement hole 19 of the reinforcing bracket 13.

In this state, the engagement projection 44 of the front door 5 engages with the front engagement hole 18 of the reinforcing bracket 13, and the engagement projection 44 of the rear door 6 engages with the rear engagement hole 19.

This can substantially integrally hold the front door 5 and the rear door 6 via the reinforcing bracket 13. This can also prevent the front door 5 and the rear door 6 from moving differently when an impact is applied to the front door 5 and the rear door 6 at the time of a side collision that is a collision on the side surface of the vehicle body 2. This can prevent the front door 5 and the rear door 6 from opening due to the impact.

In addition, this enables the impact at the time of collision to be received by the reinforcing bracket 13 at the time of a side collision, and also enables directions of the force applied to the reinforcing bracket 13 from the engagement projections 44 to be directed to intersect with each other. This can prevent the force from concentrating on the reinforcing bracket 13, and can prevent the reinforcing bracket 13 from damage.

Further, since the lower rail bracket is fixed to the reinforcing bracket 13, the impact applied to the lower rail and the bracket can be dispersed to the vehicle body 2 via the reinforcing bracket 13.

As described above, in this embodiment, the wall surface of the reinforcing bracket 13 is provided with engagement holes (engaged portions) on the front side and the rear side. A lower arm 40 of a front door 5 and a lower arm 40 of a rear door 6 are each provided with an engagement projection 44 (engaging portion) that engages with an engagement hole when the front door 5 and the rear door 6 fully close.

This engages the engagement holes of the reinforcing bracket 13 with the engagement projections 44 provided on the lower arm 40 of the front door 5 and the lower arm 40 of the rear door 6 when the front door 5 and the rear door 6 are fully closed. This can substantially integrally hold the front door 5 and the rear door 6 via the reinforcing bracket 13. Therefore, when an impact is applied to the front door 5 and the rear door 6 at the time of a side collision, the front door 5 and the rear door 6 can be prevented from moving differently, and the front door 5 and the rear door 6 are prevented from opening due to the impact.

In addition, in this embodiment, the engagement holes (engaged portions) and the engagement projections (engaging portions) are provided so that the engagement directions of the front side and the rear side intersect each other.

This directs the directions of the force applied to the reinforcing bracket 13 from the engagement projections 44 to intersect each other when an impact is applied to the front door 5 and the rear door 6 at the time of a side collision. This can prevent the force from concentrating on the reinforcing bracket 13, and can prevent the reinforcing bracket 13 from damage.

In addition, in this embodiment, the reinforcing bracket 13 and the striker 21 are jointly fastened and fixed to the side sill 10.

This enables the impact applied to the front door 5 and the rear door 6 at the time of a side collision to be received by the reinforcing bracket 13, and can prevent the striker 21 from being damaged to open the front door 5 and the rear door 6.

Furthermore, in this embodiment, the vertical wall portion 14 of the reinforcing bracket 13 is placed on vehicle inner side of the striker 21.

As a result, if impact at the time of a side collision applies force for moving the striker 21 toward the inside of the vehicle, the force can be received by the vertical wall portion 14 of the reinforcing bracket 13. This can prevent the striker 21 from being damaged to open the front door 5 and the rear door 6.

In addition, in this embodiment, each lower rail bracket is formed with a hole portion corresponding to the engagement hole (engaged portion), and the periphery of the hole is provided with a cushioning member 33. The cushioning member 33 comes into contact with the base portion 46 of the engagement projection 44 (engaging portion) when the front door 5 and the rear door 6 fully close.

As a result, when the front door 5 and the rear door 6 fully close, each cushioning member 33 comes into contact with the base portion 46 of the engagement projection 44, so that the reinforcing bracket 13 and the lower roller 48 are positioned. Since the lower rail bracket is attached to the lower rail, the lower roller 48 can be positioned with respect to the lower rail.

In addition, in this embodiment, the lower rail bracket is fixed to the reinforcing bracket 13.

Since the lower rail bracket is fixed to the reinforcing bracket 13, the impact applied to the lower rail and the bracket can be dispersed to the vehicle body 2 via the reinforcing bracket 13.

In addition, in this embodiment, the base end parts of the lower arm 40 of the front door 5 and the rear door 6 are provided with a sliding door bracket 41 and a female member 42 connecting the sliding door bracket 41 and the lower arm 40. On the upper surface of the reinforcing bracket 13, there is attached a reinforcing member 36 including a stepped portion 37 into which the support portion of the female member 42 is inserted.

As a result, the female member 42 is inserted into the stepped portion 37 of the reinforcing member 36, so that the front door 5 and the rear door 6 can be prevented from falling to the outside of the vehicle body 2.

Although the above describe the embodiments of the present invention, various design changes with the present invention can be made without departing from the gist thereof.

Configurations Supported by the Above Embodiment

The above embodiment supports the following configurations.

(Configuration 1)

A sliding door structure of a vehicle in which a front door and a rear door both are sliding doors, the sliding door structure including: a front door and a rear door; lower arms respectively extending from lower parts of the front door and the rear door toward the vehicle body; and lower rails, attached on an upper part of a side sill of the vehicle body, for guiding lower rollers attached on ends of the lower arms, wherein: on the side sill, there is attached a reinforcing bracket having a wall surface facing the outside of the vehicle body; the wall surface of the reinforcing bracket is provided with engaged portions on a front side and a rear side, respectively; and the lower arm of the front door and the lower arm of the rear door are each provided with an engaging portion that engages with each of the engaged portions when the front door and the rear door are fully closed.

This configuration can almost integrally hold the front door and the rear door via the reinforcing bracket. Therefore, when an impact is applied to the front door and the rear door at the time of a side collision, it is possible to prevent the front door and the rear door from moving differently, and it is possible to prevent the front door and the rear door from opening due to the impact.

(Configuration 2)

The sliding door structure according to configuration 1, wherein the engaged portions and the engaging portions are provided so that engagement directions of the front side and the rear side intersect each other.

This configuration can direct the directions of the force applied to the reinforcing bracket from the engagement projections to intersect each other when an impact is applied to the front door and the rear door at the time of a side collision. This can prevent the force from concentrating on the reinforcing bracket, and can prevent the reinforcing bracket from damage.

(Configuration 3)

The sliding door structure according to configuration 1 or 2, wherein: there is provided a striker that fits a latch mechanism when the front door fully closes, in a vicinity of a substantially central portion in a front-rear direction of the reinforcing bracket, the latch mechanism being provided on the front door; and the reinforcing bracket and the striker are jointly fastened and fixed to the side sill.

This configuration enables the impact applied to the front door and the rear door at the time of a side collision to be received by the reinforcing bracket, and enables the striker to be prevented from damage to open the front door and the rear door.

(Configuration 4)

The sliding door structure according to configuration 1 or 2, wherein: there is provided a striker that fits a latch mechanism when the front door fully closes, in a vicinity of a substantially central portion in a front-rear direction of the reinforcing bracket, the latch mechanism being provided on the front door; and a vertical wall portion of the reinforcing bracket is placed on the vehicle inner side of the striker.

This configuration enables force, which is applied to the striker toward the inside of the vehicle due to the impact at the time of a side collision, to be received by the vertical wall portion of the reinforcing bracket, and thereby enables the striker to be prevented from damage to open the front door and the rear door.

(Configuration 5)

The sliding door structure according to any one of configurations 1 to 4, wherein: the lower rails each have a lower rail bracket extending toward the reinforcing bracket; and the lower rail bracket is formed with a hole portion corresponding to the engaged portion, a periphery of the hole portion is provided with a cushioning member, and the cushioning member comes into contact with a base portion of each engaging portion when the front door and the rear door fully close.

According to this configuration, when the front door and the rear door fully closes, each cushioning member comes into contact with the base portion of the engagement projection to position the reinforcing bracket and the lower roller. Since the lower rail bracket is attached to the lower rail, the lower roller can be positioned with respect to the lower rail.

(Configuration 6)

The sliding door structure according to configuration 5, wherein the lower rail bracket is fixed to the reinforcing bracket.

According to this configuration, the lower rail bracket is fixed to the reinforcing bracket, so that the impact applied to the lower rail and the bracket can be dispersed to the vehicle body via the reinforcing bracket.

(Configuration 7)

The sliding door structure according to any one of configurations 1 to 6, wherein: base end parts of the lower arms of the front door and the rear door are each provided with a sliding door bracket and a female member connecting the sliding door bracket and the lower arm; and a reinforcing member is attached on an upper surface of the reinforcing bracket, the reinforcing member including a stepped portion into which a support portion of the female member is inserted.

This configuration enables the female member to be inserted into the stepped portion of the reinforcing member to prevent the front door and the rear door from falling to the outside of the vehicle body.

REFERENCE SIGNS LIST 1 vehicle
2 vehicle body
3 tire
4 sliding door
5 front door
6 rear door
10 side sill
11 front lower rail
12 rear lower rail
13 reinforcing bracket
14 vertical wall portion
16 front support surface
17 rear support surface
18 front engagement hole
19 rear engagement hole
21 striker
30 front lower rail bracket
31 support plate
33 cushioning member
34 rear lower rail bracket
35 support plate
36 reinforcing member
37 stepped portion
40 lower arm
41 sliding door bracket
42 female member
43 support piece
44 engagement projection
47 latch member for full closing
48 lower roller
50 latch member for full opening

What is claimed is:

1. A sliding door structure of a vehicle in which a front door and a rear door both are sliding doors, the sliding door structure comprising:
a front door and a rear door;
lower arms respectively extending from lower parts of the front door and the rear door toward a vehicle body of the vehicle; and
lower rails, attached on an upper part of a side sill of the vehicle body, for guiding lower rollers attached on ends of the lower arms,
wherein: on the side sill, there is attached a reinforcing bracket having a wall surface facing an outside of the vehicle body;
the reinforcing bracket includes a front support surface and a rear support surface which are inclined with respect to a front-rear direction of the vehicle body, at both ends in the front-rear direction;
the front support surface and the rear support surface are formed so that a direction orthogonal to the front support surface and a direction orthogonal to the rear support surface intersect each other inside the vehicle body;
the front support surface and the rear support surface of the reinforcing bracket are provided with a front engagement hole and a rear engagement hole as engaged portions, respectively; and
the lower arm of the front door and the lower arm of the rear door are each provided with an engaging portion that engages with each of the engaged portions when the front door and the rear door are fully closed.

2. The sliding door structure according to claim 1, wherein:
there is provided a striker that fits a latch mechanism when the front door fully closes, in a vicinity of a substantially central portion in a front-rear direction of the reinforcing bracket, the latch mechanism being provided on the front door; and
a flange portion of the reinforcing bracket and the striker are jointly fastened and fixed to the side sill via a bolt.

3. The sliding door structure according to claim 1, wherein:
there is provided a striker that fits a latch mechanism when the front door fully closes, in a vicinity of a substantially central portion in a front-rear direction of the reinforcing bracket, the latch mechanism being provided on the front door; and
a vertical wall portion of the reinforcing bracket is placed on a vehicle inner side of the striker.

4. The sliding door structure according to claim 1, wherein:
the lower rails each have a lower rail bracket extending toward the reinforcing bracket; and
the lower rail bracket is provided with a cushioning member, and the cushioning member comes into contact with a base portion of each engaging portion when the front door and the rear door fully close.

5. The sliding door structure according to claim 4, wherein the lower rail bracket is fixed to the reinforcing bracket.

6. The sliding door structure according to claim 1, wherein:
base end parts of the lower arms of the front door and the rear door are each provided with a sliding door bracket and a female member connecting the sliding door bracket and the lower arm; and
a reinforcing member is attached on an upper surface of the reinforcing bracket, the reinforcing member including a stepped portion into which a support portion of the female member is inserted.

7. A sliding door structure of a vehicle in which a front door and a rear door both are sliding doors, the sliding door structure comprising:
a front door and a rear door;
lower arms respectively extending from lower parts of the front door and the rear door toward a vehicle body of the vehicle; and
lower rails, attached on an upper part of a side sill of the vehicle body, for guiding lower rollers attached on ends of the lower arms,
wherein: on the side sill, there is attached a reinforcing bracket having a wall surface facing an outside of the vehicle body;
the wall surface of the reinforcing bracket is provided with engaged portions on a front side and a rear side, respectively;
the lower arm of the front door and the lower arm of the rear door are each provided with an engaging portion that engages with each of the engaged portions when the front door and the rear door are fully closed;

there is provided a striker that fits a latch mechanism when the front door fully closes, in a vicinity of a substantially central portion in a front-rear direction of the reinforcing bracket, the latch mechanism being provided on the front door; and a flange portion of the reinforcing bracket and the striker are jointly fastened and fixed to the side sill via bolts.

8. A sliding door structure of a vehicle in which a front door and a rear door both are sliding doors, the sliding door structure comprising:

a front door and a rear door;

lower arms respectively extending from lower parts of the front door and the rear door toward a vehicle body of the vehicle; and lower rails, attached on an upper part of a side sill of the vehicle body, for guiding lower rollers attached on ends of the lower arms, wherein: on the side sill, there is attached a reinforcing bracket having a wall surface facing an outside of the vehicle body;

the wall surface of the reinforcing bracket is provided with engaged portions on a front side and a rear side, respectively;

the lower arm of the front door and the lower arm of the rear door are each provided with an engaging portion that engages with each of the engaged portions when the front door and the rear door are fully closed;

there is provided a striker that fits a latch mechanism when the front door fully closes, in a vicinity of a substantially central portion in a front-rear direction of the reinforcing bracket, the latch mechanism being provided on the front door; and a vertical wall portion of the reinforcing bracket is placed on a vehicle inner side of the striker.

\* \* \* \* \*